(12) United States Patent  (10) Patent No.: US 7,395,705 B2
Greene  (45) Date of Patent: Jul. 8, 2008

(54) SYSTEM FOR MEASURING AN AIRFLOW ANGLE AT THE WINGTIP OF AN AIRCRAFT

(76) Inventor: Leonard M. Greene, 1010 Greacen Point Rd., Mamaroneck, NY (US) 10543

( * ) Notice: Subject to any disclaimer, the term of this patent is extended or adjusted under 35 U.S.C. 154(b) by 78 days.

(21) Appl. No.: 11/471,583

(22) Filed: Jun. 21, 2006

(65) Prior Publication Data
US 2007/0295078 A1  Dec. 27, 2007

(51) Int. Cl.
*G01P 13/00* (2006.01)
(52) U.S. Cl. .................. 73/170.01; 73/170.02; 73/178; 73/186
(58) Field of Classification Search ............. 73/170.02, 73/170.01, 178, 186
See application file for complete search history.

(56) References Cited

U.S. PATENT DOCUMENTS

| | | | | |
|---|---|---|---|---|
| 3,819,135 A | * | 6/1974 | Foxworthy et al. | 244/177 |
| 4,230,290 A | * | 10/1980 | Townsend et al. | 244/1 R |
| 4,814,764 A | * | 3/1989 | Middleton | 340/967 |
| 4,908,619 A | * | 3/1990 | Bala et al. | 340/966 |
| 4,924,401 A | * | 5/1990 | Bice et al. | 701/6 |
| 5,060,889 A | * | 10/1991 | Nadkarni et al. | 244/183 |
| 5,590,853 A | * | 1/1997 | Greene | 244/184 |
| 6,531,967 B2 | * | 3/2003 | Djorup | 340/949 |
| 2002/0171563 A1 | * | 11/2002 | Djorup | 340/968 |

* cited by examiner

*Primary Examiner*—Andre J. Allen
(74) *Attorney, Agent, or Firm*—Lowe Hauptman Ham & Berner, LLP

(57) ABSTRACT

A vortex angle system includes one or more vortex angle sensors disposed on one or more wingtips of an aircraft. A summing circuit and computer compare signals from each sensor to provide a signal, which is indicative of the average vortex angle of the aircraft.

4 Claims, 2 Drawing Sheets

SYSTEM FOR MEASURING AN AIRFLOW ANGLE AT THE WINGTIP OF AN AIRCRAFT

FIELD OF THE INVENTION

This invention relates to a system for measuring the airflow angle at the wingtip of an aircraft and more particularly to a device for measuring the vortex angle of an aircraft.

BACKGROUND FOR THE INVENTION

Modern commercial aircraft typically include a stall warning system which is triggered by the angle of attack of the aircraft as determined by an angle of attack vane. Such aircraft also include an integrated airspeed control command and display system which aids a pilot during take-off, climb out, let down, approach, landing and go-around maneuvers. Such integrated systems are also based on various parameters relating to flight conditions including the aircraft's angle of attack as determined by an angle of attack vane or the like.

It is customary to locate the angle of attack vane on the sides of an aircraft's fuselage. However, these side mountings may lead to problems when the aircraft is in a banked turn or flown in a yawed flight. Under such conditions, i.e. when an aircraft is in a banked turn or flown in a yawed condition, the position of the angle of attack sensing vane will be determined by the local airflow passing the vane. The angle of attack vanes are usually located so that the changes in the local airflow at the vane cause the vane to pivot in accordance with the angle of attack. The local airflow at these fuselage locations are determined to a lesser extent by the yaw of the aircraft so that the indicated angle of attack is actually a function of both the angle of attack and the yaw.

One approach for avoiding yaw induced problems is disclosed in my earlier patent for an aircraft control system, as disclosed in my U.S. Pat. No. 5,590,853. As disclosed therein, an aircraft control system computes a yaw compensated angle of attack. The system includes an angle of attack sensor for generating a signal which represents an aircraft's angle of attack as determined by an angle of attack vane and a transverse accelerometer for generating a signal in response to the lateral acceleration of the aircraft. A summing device sums the two signals to thereby provide a yaw compensated angle of attack signal.

All aircraft produce wake vortices like two small horizontal tornadoes trailing behind the wingtips. The larger and heavier the plane the stronger the wake. These vortices result from the outflow and uplift of air around the wingtip of an aircraft and have a relationship to a wing's lift. Accordingly, it is believed that measuring the airflow angle at the wingtip, referred to hereinafter as the vortex angle may provide more accurate information than a conventional angle of attack system.

Accordingly, it is presently believed that there may be a commercial market for an airflow system to measure the vortex angle. There should be a commercial market for a system in accordance with the present invention because it is believed that such system will reduce or eliminate problems associated with banked turns and yaw particularly during landings and provide a more accurate indication of the vortex angle as the plane banks and turns.

Further, the systems in accordance with the present invention should be less likely to be physically damaged when a plane is being served or worked on. Such systems will also be accessible and readily replaced in the event of damage, are durable and can be produced and installed at a reasonable cost.

BRIEF SUMMARY OF THE INVENTION

In essence, the present invention contemplates a vortex angle system which includes a sensor such as a vane and means for generating a signal responsive to the position of the vane. In this invention, the sensor is located on or immediately adjacent to and forward of a wingtip as opposed to being mounted on an aircraft's fuselage or on an inward portion of a wing. It is presently believed that locating the sensor forward of the wingtip will reduce or minimize problems associated with turning the aircraft and/or yaw due to a potentially inaccurate measurement.

In a preferred embodiment of the invention, sensors are located on or adjacent opposite wingtips on an aircraft. The two signals produced by the sensors are averaged and the vortex angle is based upon an average of the two signals.

The invention will now be described in connection with the accompanying drawings wherein like numerals have been used to designate like parts.

DETAILED DESCRIPTION OF THE PREFERRED EMBODIMENTS OF THE INVENTION

As a plane flies through the air, the wings must have a certain minimum pitch relative to the direction of flight in order to create the lift for supporting the weight of the plane. The pitch or angle between the wing centerline and the direction of the flight is known as the angle of attack. Since a wing develops greater lift at higher speeds, the necessary angle of attack at higher speeds is less than at lower speeds. Therefore, there is an inverse relationship between the angle of attack and airspeed for any particular plane.

Angle of attack becomes critically important at slow speeds when the aircraft is relatively close to the ground since every airplane has a certain angle of attack beyond which it goes into a stall. Every plane has a corresponding stall speed that will vary depending on loading, turning and banking conditions at the stall angle. However, the angle of attack provides a consistent indication of the aircraft's lift characteristics regardless of the pay load or turning angle of the plane. For this reason, stall warning systems are typically based on angle of attack as measured by an angle of attack vane. Therefore, a more accurate determination of the aircraft's lift may contribute to the safety of the aircraft.

Figure 1:
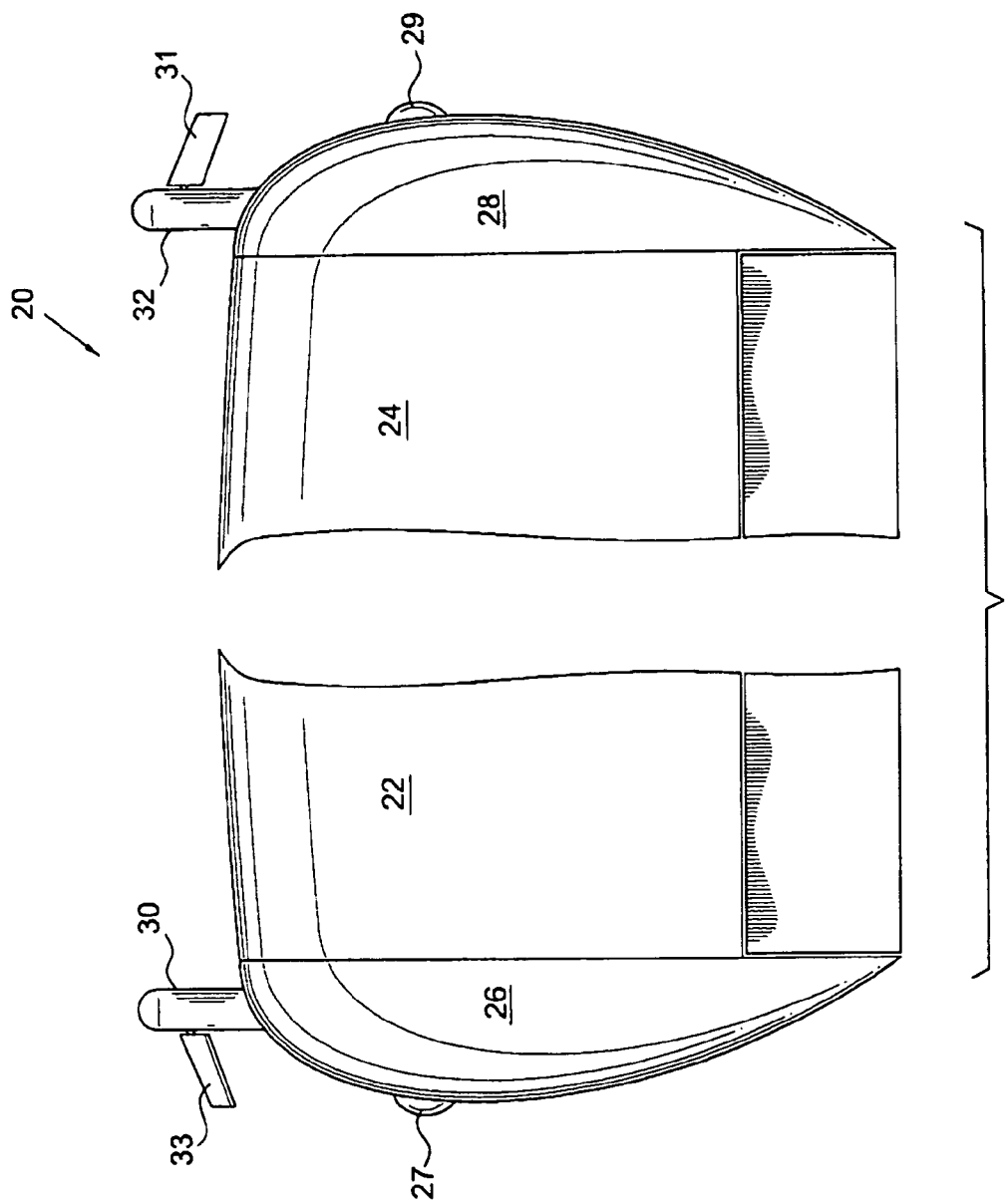
FIG. 1 is a top or plan view of an aircraft wing and a vortex angle vane in accordance with the present invention disposed forwardly and outwardly from the wingtip.
Figure 2:
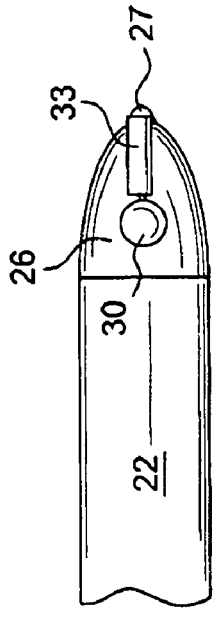
FIG. 2 is a front elevational view of a first portion of the wing shown in FIG. 1 with a vane at 0°.
Figure 3:
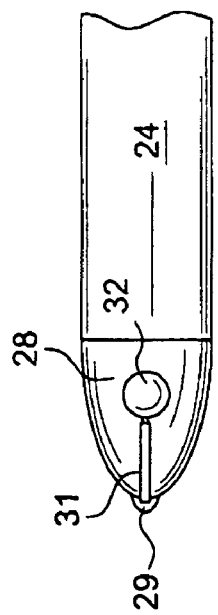
FIG. 3 is a front elevational view of a portion of an opposite wing from the one shown in FIG. 1, but with the vane at a 45° angle.

As shown in FIGS. 1-3, an aircraft wing 20 includes two outer portions 22 and 24 at opposite ends thereof. As shown, the wing 20 also includes opposite wingtips 26 and 28 with lights 25 and 27 on the wingtips 26 and 28 respectively in a conventional manner.

Forward facing probes 30 and 32 extend forward of the wingtips 22 and 24. Each of the probes 30 and 32 include a vane 31 and 33 respectively for measuring the vortex angle i.e. the angle of the air stream at the wingtip. It is believed that the vortex angle may be a more accurate indication of the lift since it is forward and outside of the structure of the aircraft. It may also utilize the structure and mechanism of an angle of attack vane for measuring the vortex angle. In a first embodiment of the invention the length of the forwardly extending probes are between about 15 to about 20% of the width of the wing. The length is chosen to be relatively short to give an accurate indication of the vortex angle without excess vibration and at the same time to be forward to avoid the influence of the aircraft's structure.

Figure 4:
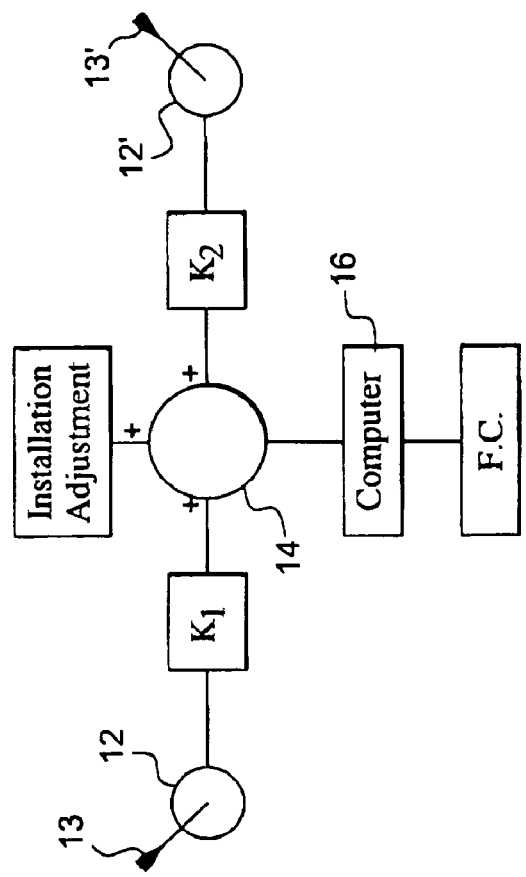
FIG. 4 is a schematic illustration, which shows the basic features of the invention.

The operation of the vortex angle system in accordance with the present invention will now be described in connection with FIG. 4. As shown therein, vortex sensors 12 and 12' are disposed on each wingtip 26 and 28 respectively and generate a signal in response to the position of the angle of attack vanes 31 and 33. The signals which are multiplied by constants $K_1$ and $K_2$ respectively represent the aircraft's vortex angle as indicated by its vortex angle vanes 31 and 33 and are fed to a summing device 14. The summing device 14 adds the two signals and produces a signal that is fed to a computer 16. The computer 16 averages the vortex angle signals which are then fed to a flight control director 18 or other instruments in the cockpit of the aircraft.

The invention also contemplates a method for determining the vortex angle of an aircraft by disposing a vortex angle sensor such as an angle of attack vane on each wingtip of an aircraft. The method also includes the steps of measuring the vortex angle at each wingtip and producing a signal indicative of the aircraft's vortex angle from each of the sensors. The two signals are then averaged to produce a signal which is indicative of the aircraft's actual vortex angle.

While the invention has been described in connection with its preferred embodiments, it should be recognized that changes and modifications may be made therein without departing from the scope of the appended claims.

What is claimed is:

1. A vortex angle system comprising
a wing of an aircraft having a first wingtip and a second wingtip at an opposite end of said wing;
a vortex angle sensor for generating a signal which represents an aircraft's vortex angle;
said vortex angle sensor including a pair of angle of attack sensors indicative of the lift of an aircraft with one of said angle of attack vanes disposed on each of said wingtips and forwardly thereof; and
means for averaging the signals from each of said sensors and means for indicating the vortex angle of the aircraft based on the signals from said sensors.

2. A vortex angle system according to claim 1 which includes a pair of forwardly extending probes with one of said angle of attack vanes disposed on each of said probes.

3. A vortex angle of attack system according to claim 2 in which each of said forwardly extending probes has a length of between about 15% to 20% of the width of said wing and said angle of attack vanes are disposed in a forward portion of said probes.

4. A method for determining the vortex angle of an aircraft, the method comprising:
providing two vortex angle sensors including two angle of attack vanes indicative of the lift characteristic of an aircraft;
disposing one of said angle of attack vanes on each wingtip of an aircraft and forwardly thereof;
measuring the vortex angle of the aircraft at each wingtip;
producing a signal indicative of the aircraft's vortex angle at each wingtip; and
averaging the signals from the sensors and producing a signal indicative of the aircraft's vortex angle.

* * * * *